United States Patent [19]

McKinnis et al.

[11] Patent Number: 5,546,581

[45] Date of Patent: Aug. 13, 1996

[54] METHOD FOR INTEGRATING A DISCRETE SUBPROGRAM INTO A MAIN PROGRAM

[75] Inventors: David R. R. McKinnis; David L. Luebbert, both of Bellevue; Eric R. Berman, Redmond; Thomas W. Saxton, Bellevue, all of Wash.; Daniel H. Padwa, Stony Brook, N.Y.

[73] Assignee: Microsoft Corporation, Redmond, Wash.

[21] Appl. No.: 208,094

[22] Filed: Mar. 8, 1994

Related U.S. Application Data

[63] Continuation of Ser. No. 812,764, Dec. 23, 1991, abandoned.

[51] Int. Cl.⁶ .................................................. G06F 9/42
[52] U.S. Cl. .................... 395/650; 395/375; 364/262.5; 364/255.7; 364/DIG. 1
[58] Field of Search .................................... 395/650, 700, 395/375

[56] References Cited

U.S. PATENT DOCUMENTS

| | | | |
|---|---|---|---|
| 4,425,618 | 1/1984 | Bishop | 364/300 |
| 4,791,558 | 12/1988 | Chaitin et al. | 364/200 |
| 5,128,878 | 7/1992 | Gore et al. | 395/162 |
| 5,136,710 | 8/1992 | Arnold et al. | 395/700 |
| 5,146,581 | 9/1992 | Kaneko | 395/425 |
| 5,175,828 | 12/1992 | Hall et al. | 395/375 |
| 5,202,923 | 4/1993 | Kuriyama | 380/50 |
| 5,222,134 | 6/1993 | Waite et al. | 380/49 |
| 5,247,678 | 9/1993 | Littlejohn | 395/700 |

OTHER PUBLICATIONS

The Institute of Physics Bristol and London, "Electron Microscopy and Analysis, 1981" Conference Series Number 61; pp. 143–146. Authors: R. Browning, D. C. Peacock and M. Prutton.

Apple Computer, Inc., "Inside Macintosh Volume I", Fifth Printing, Apr. 1987; Chapter 5; Resource Manager pp. 101–134.

Apple Computer, Inc., "Inside Macintosh Volume I", Fifth Printing, Apr. 1987; Chapter 9; Window Manager pp. 297–302

Apple Computer, Inc. "Inside Macintosh Volume I", Fifth Printing, Apr. 1987; Chapter 10; Control Manager pp. 328–332.

Apple Computer, Inc., "Inside Macintosh Volume I", Fifth Printing, Apr. 1987; Chapter 14; Desk Manager pp. 443–448.

Apple Computer, Inc. "Inside Macintosh Volume I"; Fifth Printing, Apr. 1987; Chapter 17; Package Manager pp. 481–485.

(List continued on next page.)

*Primary Examiner*—Kevin A. Kriess
*Assistant Examiner*—John I. Chavis
*Attorney, Agent, or Firm*—Seed and Berry

[57] ABSTRACT

A method is disclosed for integrating a plurality of discrete subprograms with a main program. The method enables the main program to integrate any discrete subprogram stored in its directory with the main program. The method includes the step of identifying each discrete subprogram stored in the directory of the main program and creating a cross reference array to enable the main program to access the plurality of subprograms. In addition to creating the cross reference array, an event reference list of the main program is updated, enabling commands of the subprogram to be given key and menu assignments, thereby further integrating the subprogram with the main program. Similarly, the subprogram can be removed from the main program simply by deleting the subprogram from the directory of the main program. Further features of the subject invention include a method for enabling the subprogram to request the main program to perform main program functions, and a method for limiting the number of subprograms loaded in the address space of the computer.

25 Claims, 6 Drawing Sheets

OTHER PUBLICATIONS

Apple Computer, Inc., "Inside Macintosh Volume I"; Fifth Printing, Apr. 1987; Chapters 18, 19 and 20; Binary–Decimal; Int'l. Utilities, and Standard File pp. 487–491; 493–513; and 515–530.

Apple Computer, Inc., "Inside Macintosh Volume II"; Third Printing, Mar. 1986; Chapter 6; Device Manager pp. 173–207.

Apple Computer, Inc., "Inside Macintosh Volume IV"; First Printing, Aug. 1986; Chapter 7; Control Manager pp. 53–54.

Apple Computer, Inc., "Inside Macintosh Volume IV"; First Printing, Aug. 1986; Chapter 30; List Manager pp. 259–282.

Apple Computer, Inc., "Inside Macintosh Volume V"; First Printing, Jan. 1988; Chapters 8, 11, 16 and 17; Color Picker; Window Manager; Int'l. Utilities; and Script Manager pp. 171–177; 197–213; 287–292; and 293–322.

Apple Computer, Inc., "Inside Macintosh Volume V"; First Printing, Jan. 1988; Chapter 18; Control Panel pp. 323–346.

Silicon Beach Software, Inc., "Plug–in Module Developer's Toolkit"; Second Draft–Jun. 2, 1988; 1–12, 1988.

L. McLennan, "Developing Plug–in Modules for Super-Paint"; Draft–Feb. 7, 1989; 1–49, 1989.

Silicon Beach Software, Inc., "Plug–in Module Developer's Toolkit"; Third Draft–Feb. 13, 1989; 1–11, 1989.

C. Prouse, "Stand–Alone Code, ad nauseam"; Aug. 1990; 1–24, 1990.

METHOD FOR INTEGRATING A DISCRETE SUBPROGRAM INTO A MAIN PROGRAM

CROSS-REFERENCE TO RELATED APPLICATION

This application is a continuation of U.S. patent application Ser. No. 07/812,764, filed Dec. 23, 1991, now abandoned.

TECHNICAL FILED

The present invention is directed toward application programs and, more particularly, toward a method for integrating one or more discrete subprograms into a main program.

BACKGROUND OF THE INVENTION

As personal computers have become more and more commonplace in today's society, the demand for application software for use on personal computers has continued to increase. This increased demand has led to an increased number of software developers and a proliferation in the kind and number of application software programs. Further, in an effort to provide better products and gain or maintain a competitive advantage, software developers are continually enhancing existing programs.

However, with the proliferation of application software, and the resulting enhancement of existing programs, the user suffers the disadvantage that software becomes obsolete in a very short period of time. One significant contributing factor to this obsolescence is the development of new routines to enhance existing software. Although these new routines may comprise only a portion of the total software product, the user must purchase an entirely new software product to gain the benefit of the new routines. Accordingly, it is desirable to provide a software application program that can be readily modified by the user to include new routines without purchasing an entirely new main program.

Also, software developers currently face a dilemma when deciding whether to provide a large number of features, functions, and enhancements at a large price or to provide fewer features, functions, and enhancements at a lower price. It would be desirable to provide application software that could be sold in modular format so that the user can essentially customize the application program to include the features, functions, and enhancements desired. Accordingly, it is desirable to provide a method for enabling a user to readily customize an application program.

Still further, in an effort to further increase the popularity of their application software, software developers desire to provide software that is very easy to use. However, most existing methods for upgrading an application program require special expertise on the part of the person who is performing the upgrade. For this reason, many software designers currently release new versions of their software to provide the user with the most rudimentary upgrades. It is therefore desirable to provide a method and apparatus that will enable a user to easily upgrade software.

SUMMARY OF THE INVENTION

The present invention addresses each of the foregoing deficiencies of the prior art by providing a method and apparatus for integrating a discrete subprogram with a main program. In the preferred embodiment described herein, the discrete subprogram includes and is responsive to an access command for performing a subprogram function. Similarly, the main program is responsive to an event for performing an event function. The preferred method includes the step of identifying the subprogram upon initialization of the main program and storing information for enabling the main program to access the subprogram. The preferred method further comprises the step of maintaining an event reference list, including a plurality of event entries, for determining the function to be performed by the main program in response to a particular event, wherein at least one event entry includes information to identify the access command of the subprogram. The preferred method further includes the step of responding to the selection of the at least one event by accessing the subprogram so that the subprogram function will be performed.

DETAILED DESCRIPTION OF THE INVENTION

As mentioned hereinabove, the subject invention provides a method for completely integrating a discrete subprogram with a main program so that commands of the subprogram are invoked in the same manner as commands of the main program. Generally, the discrete subprogram may be one for performing a function usable by the main program. As an example, if the main program is provided for word processing applications, discrete subprograms could be provided to perform functions such as: spell check; thesaurus; print; retrieve document; help; etc. An important aspect of the subject invention is that the discrete subprogram is integrated into the main program so that, as viewed by the user, the discrete subprogram is part of the main program. As will be described in more detail below, the preferred method described herein enables the discrete program to be integrated into the main program so that commands for performing the discrete subprogram function can be assigned to keys on the keyboard or positions on the main program menus. By pressing the assigned key, or accessing the appropriate menu position, the user can invoke the function of the discrete subprogram in the same way as functions performed by the main program are invoked.

Figure 1:
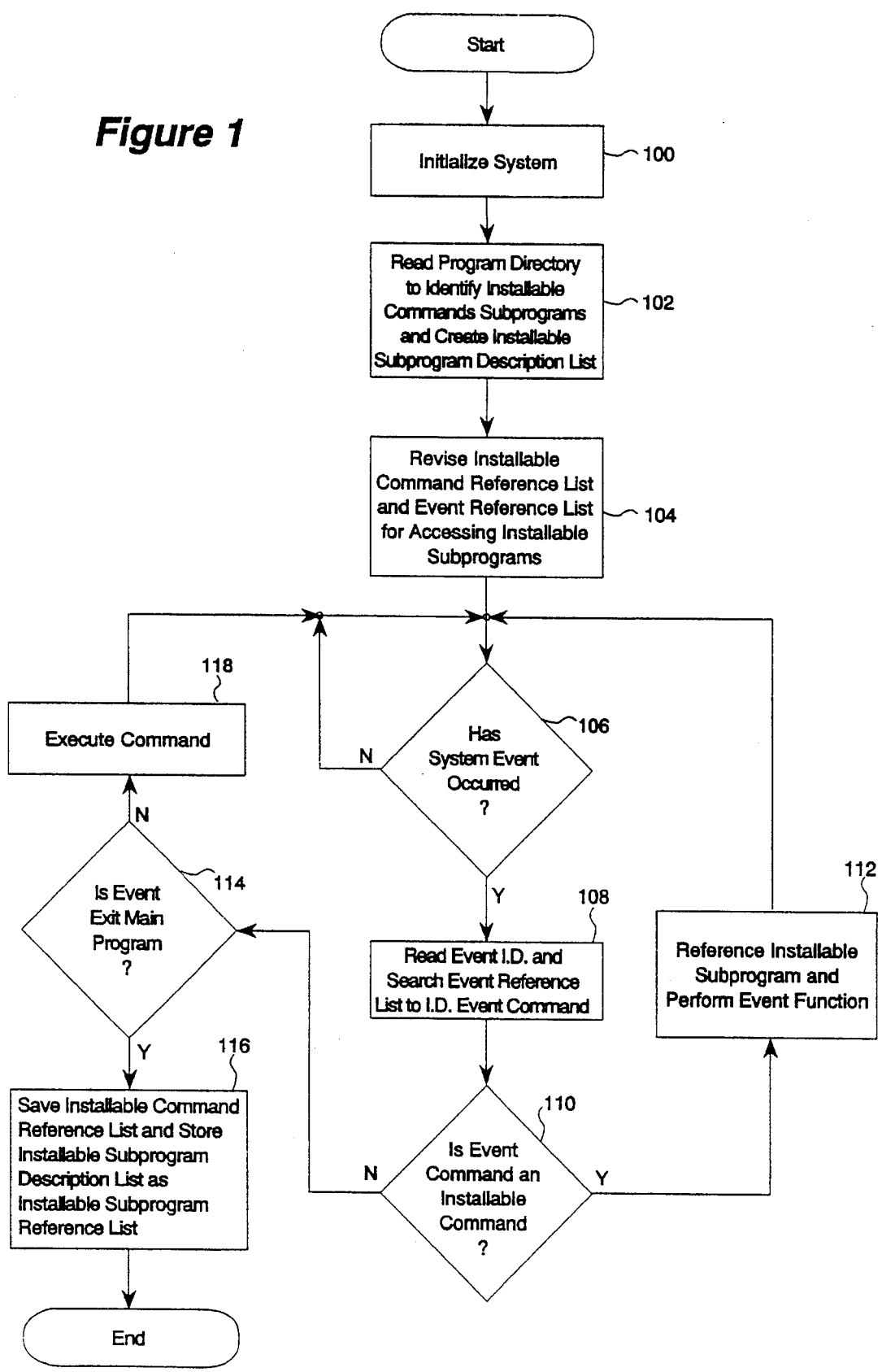
FIG. 1 is a decision flow diagram illustrating a preferred method of the subject invention for integrating a discrete subprogram with a main program.

The general method of the preferred embodiment described herein is illustrated by the decision flow diagram of FIG. 1. Prior to running the main program, the main program is stored in a directory on a computer, as is known in the art. The discrete subprograms that are to be used with the main program are stored in the same directory, or a subdirectory. When the main program is run by the user, the system is initialized at step 100. As is known in the art, initialization of the system entails loading the main program into the computer's memory space, setting and resetting registers to desired states as determined by the initialization routine of the main program, and providing a user prompt to indicate that the program is ready for use. In addition to initializing the main program, the main program will read its directory to identify any installable subprograms that have been stored for use with the main program, step 102. Each installable subprogram will include predetermined information in a predetermined file to describe the subprogram. The main program will access the predetermined file and develop a cross reference array for accessing the discrete subprogram, step 104.

Figure 5A:
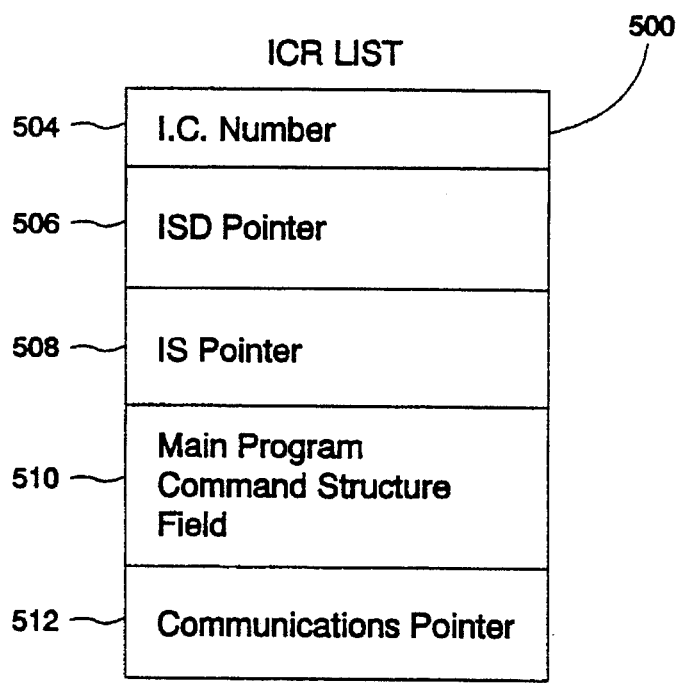
FIGS. 5A and 5B are diagrams illustrating the data structure for lists used to reference the discrete subprogram from the main program in accordance with the preferred embodiment described herein.
Figure 5B:
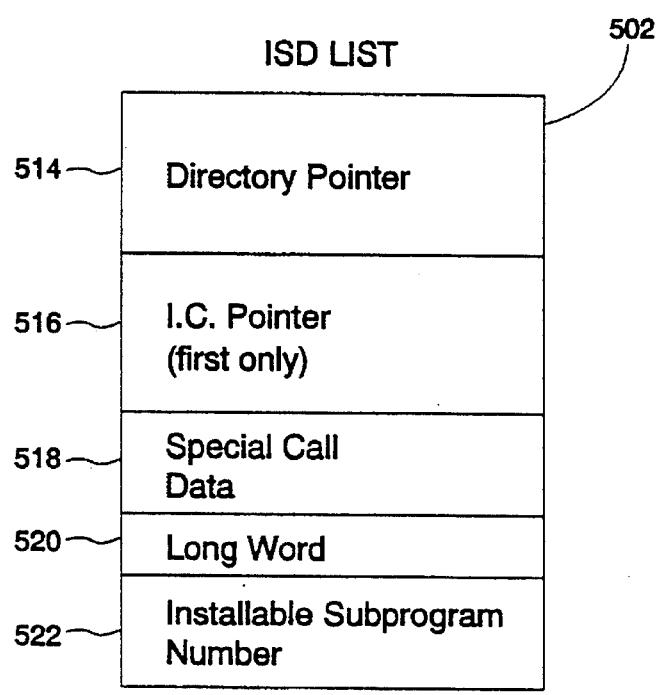

More particularly, the main program will develop an installable subprogram description list (ISD), step 102, and an installable command reference list (ICR), step 104, to describe the discrete subprogram and permit access to the discrete subprogram by the main program. With reference to FIGS. 5A and 5B, diagrams are provided illustrating the data structure of the installable command reference list (FIG. 5A) and the installable subprogram description list (FIG. 5B). The installable command reference list 500 is a list of each installable command in each subprogram identified by the main program (step 102, discussed above). It is noted that each subprogram may include one or more commands and, accordingly, the number of commands on the installable command reference list will usually exceed the number of discrete subprograms identified. For each command listed on the installable command reference list, a data structure 500 is provided.

The data structure for each installable command entry includes an installable command number (IC number) 504 to identify the installable command. The installable command numbers can be assigned in a variety of ways without departing from the scope of the subject invention. However, in a presently preferred embodiment of the invention, the installable command number is a seven bit number enabling 127 commands for each installable subprogram. Following the installable command number is an installable subprogram description pointer (ISD pointer) 506 to the installable subprogram description list 502. The ISD pointer is an eight bit number enabling the user to access a maximum of 256 installable subprograms. Following the ISD pointer is an installable subprogram pointer (IS pointer) 508 to the installable subprogram to identify the portion of the installable subprogram that executes the command function. Following the installable subprogram pointer 508 is a main program command structure field 510 that is provided for storing information identifying characteristics of the command. The information stored in the main program command structure field 510 is similar to information provided for commands of the main program. A communications pointer 512 is also provided for pointing to a memory location for storing data structures to be communicated to the subprogram, thereby to interface the main program with the discrete subprogram, as will be described in more detail below.

The installable subprogram description list (ISD list) 502 is an array of data that describes each installable subprogram identified by the main program. The data structure illustrated in FIG. 5B is provided for each installable subprogram identified. The installable subprogram description list includes a pointer 514 to the installable subprogram directory location to enable the main program to locate the installable subprogram in the directory for loading on the computer's memory. Following the directory pointer 514 is an IC number that identifies the first installable command listed on the installable command reference list that belongs to the subject installable subprogram. Following the first IC number 516 is data 518 identifying any special call information of the installable subprogram. As an example, data will be provided to identify: whether the installable subprogram needs to be called during idle time; whether the installable subprogram includes its own help routine; whether the installable subprogram needs to receive an "autoexec" message; whether the installable subprogram needs to receive a shutdown message; etc. A long word 520 follows the special call data for enabling the installable subprogram to store a long word that will be returned to the installable subprogram when it is next accessed. The installable subprogram number 522 follows the long word. Like the installable command number, the installable subprogram number identifies the installable subprogram.

With further reference to FIG. 1, and particularly step 104 thereof, after the main program has created the installable command reference list and the installable subprogram description list, the event reference list of the main program is revised. As is known in the art, software application programs typically include a table, file, array, or other data structure, for associating an event with an action to be performed by the program in response to the event. As used herein, an event may include input to the program by the user, such as, for example, pressing a key on the keyboard or selection of a menu item. An event may also be self-generated by the program as a result of objects imbedded by the user during prior operations. So the main program can reference an installable subprogram in response to an event, the event reference list is revised, step 104, to include a reference to installable commands from the plurality of installable subprograms identified in step 102. In a presently preferred embodiment of the invention, the references to the installable commands will be the installable command numbers (IC numbers) stored in the installable command reference list 500 (FIG. 5).

The method for enabling the event reference list to be updated is not a particular aspect of the subject invention. However, a suitable method for enabling the event reference list to be updated is shown and described in U.S. patent application Ser. No. 07/461,775, filed Jan. 8, 1990 by Raymond D. Gram, and entitled "Method and System for Customizing a User Interface in a Computer System," the disclosure of which is incorporated herein, in its entirety, by the foregoing reference thereto.

The combination of the installable command reference list, the installable subprogram description list, and the event reference list, make up the cross reference array. The cross reference array enables the main program to automatically access the plurality of installable subprograms in response to main program events. Accordingly, the cross reference array fully integrates the plurality of subprograms with the main program. Further, since the cross reference array is automatically generated to include each subprogram stored in the directory of the main program, the integration of the plurality of subprograms with the main program requires little user intervention.

Having developed the cross reference array and provided the user with a prompt to indicate that the system is ready for use, the main program awaits an event, such as user input, step 106. As mentioned above, the event may typically comprise the user pressing a key on a keyboard, selecting an item from a menu, or providing other user input to the system. Upon receipt of an event, step 106, the system will read the event ID and use the event ID to reference the appropriate command on the event reference list, step 108. The references to the installable commands of the installable subprograms are provided on the event reference list along with commands of the main program. Accordingly, the function performed by the installable subprogram can be accessed by the user simply by providing standard user input, such as, for example, selecting a menu item.

If the event command is an installable command, step 110, then the installable subprogram is referenced using the cross reference array, step 112. Thereafter, the system returns to step 106 to again await the occurrence of a system event. If the event command is not an installable command, step 110, then the system determines whether the event is to exit the main program, step 114. If the event is to exit the main program, then the system will store the installable command reference list and the installable subprogram description list, step 116, so they will be available the next time the main program is initialized. Notably, the installable subprogram description list will be stored as an installable subprogram reference list as will be discussed in more detail below by reference to FIG. 2.

If the event is not an installable command, and is not an exit from the main program, then the event is to execute one of the main program commands and the system will execute the command in the normal manner, step 118, and return to step 106 to await the occurrence of another system event.

A feature of the subject invention is that the installable commands of the installable subprogram are accessed by the user in the same manner as commands of the main program. As will be discussed in more detail below, the installable command may have default event assignments identifying key assignments or menu positions for installable commands of the installable subprograms, so that the installable subprograms will respond to these events. Still further, in accordance with the method shown and described in the above referenced U.S. patent application Ser. No. 07/461,775, the user can also select event assignments for the installable commands.

Still further, the installable commands may also preempt or postempt another command. Particularly, these commands can be invoked prior to execution of another command when the another command is selected, i.e., preempt, or invoked after the another command when the another command is selected, i.e., postempt. In sum, the installable commands are permitted each of the attributes of a command of the main program.

As mentioned above, it is desirable to store portions of the cross reference array for use during successive sessions of the main program. Accordingly, prior to exiting the main program, the system will save the installable command reference list (FIG. 5A) and the installable subprogram description list (FIG. 5B). By storing these lists after each session, significant time can be saved in revising the lists during subsequent sessions. Further, menu and key assignments made by the user can be saved from session to session. These features are particularly valuable since the typical user will rarely change the configuration of his application software, so that the same subprograms, key assignments, and menu assignments will be used many times in combination. The installable subprogram description list is stored as an installable subprogram reference list.

Figure 2:
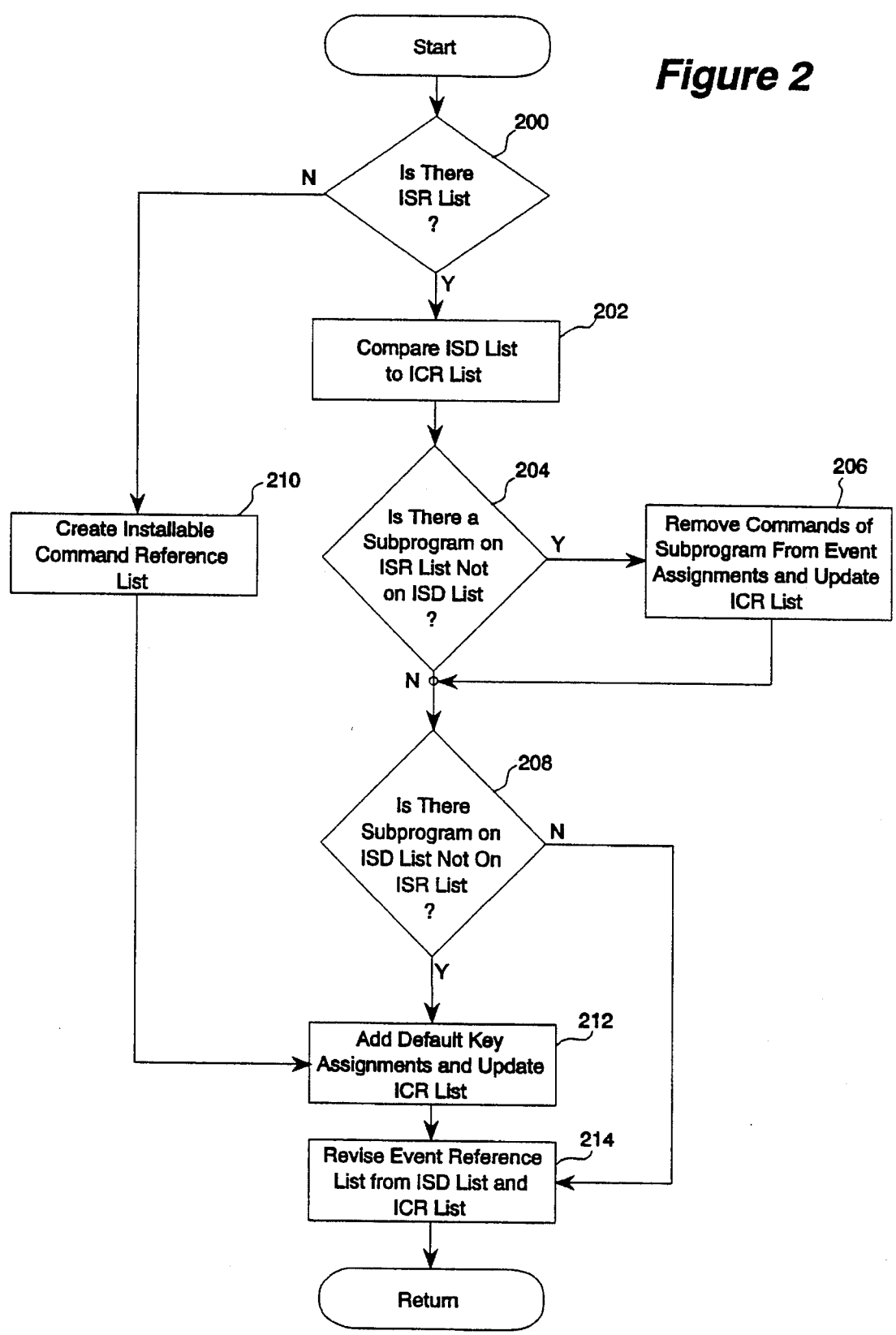
FIG. 2 is a decision flow diagram illustrating a method for maintaining reference data for interfacing the main program with the discrete subprogram in accordance with the preferred embodiment described herein.

With reference to FIG. 2, a decision flow diagram is provided for illustrating the presently preferred method for revising the cross reference array data (step 104 of FIG. 1) upon initialization of the main program. After the installable subprogram description list is generated, step 102 (FIG. 1), the system determines if an installable subprogram reference list has been saved from a previous session, step 200. If an installable subprogram reference list exists, then the installable subprogram description list (that was created in step 102, FIG. 1) is compared to the existing installable subprogram reference list, step 202. This comparison will identify any installable subprograms that have been removed from, or added to, the directory since the last session. Accordingly, if there is a subprogram on the installable subprogram reference list that is not on the installable subprogram description list, step 204, then an installable subprogram has been removed from the main program directory and the cross reference array must be revised to remove references to the subprogram and its commands. Accordingly, any installable commands of the installable subprogram are removed from the event assignments on the event reference list, step 206. Also, the commands of the installable subprogram are removed from the installable command reference list. Those skilled in the art will appreciate that both lists may be readily updated using the installable subprogram description pointer (ISD pointer) 506 of the installable command reference list 500 (FIG. 5A).

Similarly, the system determines whether there is a subprogram listed on the installable subprogram description list that is not on the installable subprogram reference list, step 208, and, if so, an installable subprogram has been added to the directory of the main program and the cross reference array must be revised to add references to the subprogram and its commands. Also, those skilled in the art will appreciate that if no installable command reference list exists, step 200, then the installable command references list must generated, step 216. After the installable command reference list has been revised, steps 200–210, or created, step 216, the commands of the added subprogram are added to the installable command reference list (ICR list), step 210, and any default key assignments for the commands of the subprogram are made. After the installable command reference list is updated, the event reference list is updated, step 214, and the system returns to step 106, to await the occurrence of an event, as described above.

Figure 3:
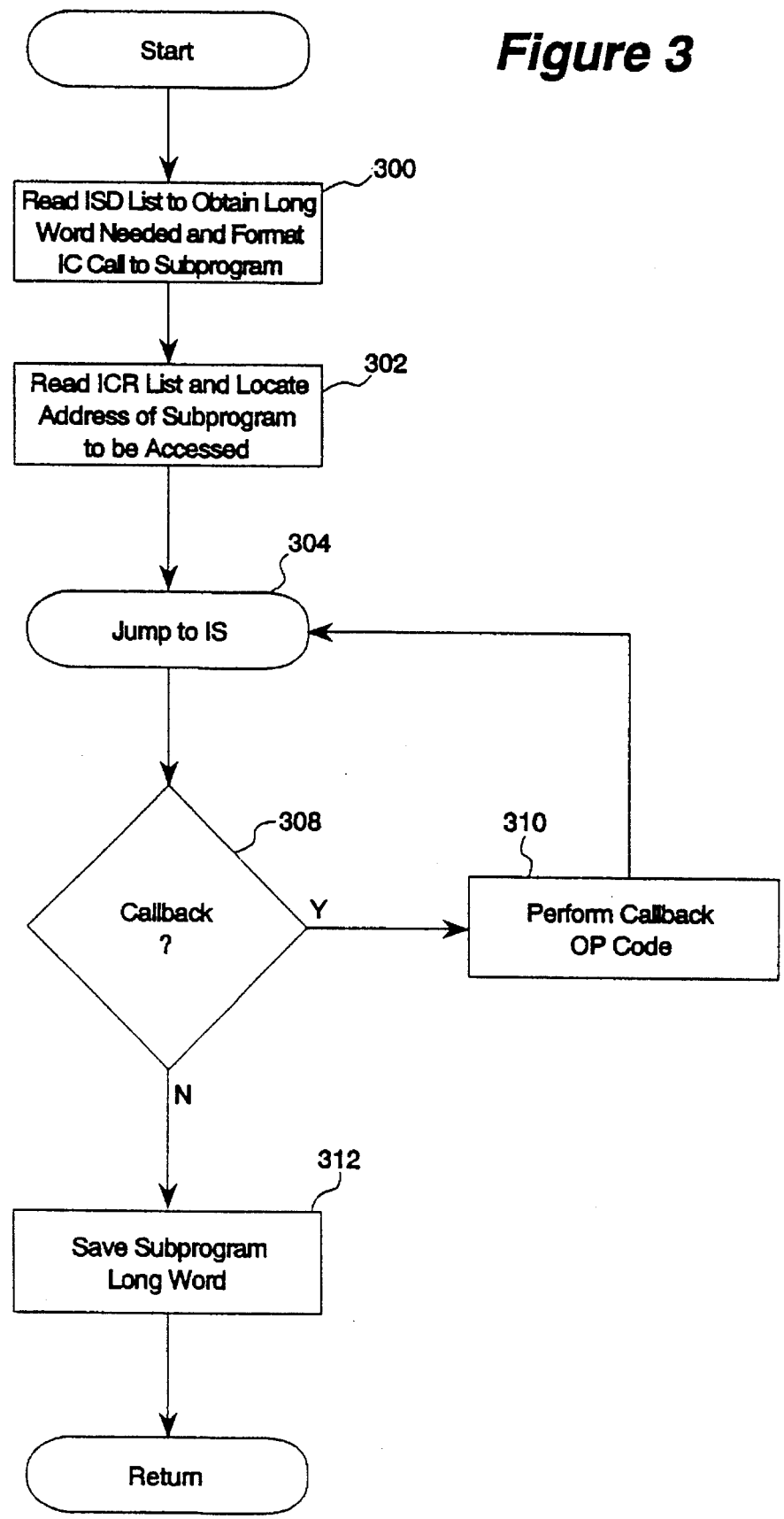
FIG. 3 is a decision flow diagram illustrating a method for enabling communication between the main program and the subprogram in accordance with the preferred embodiment described herein.

In addition to the full integration of installable commands into the main program, so that they are accessed by a user in the same manner as the main program's commands, the subprogram is fully integrated into the main program to have access to the same data, pointers, and routines, as the main program. To accomplish this, the main program includes an instruction set and memory that provides communication between the main program and the subprogram. The method of communication is illustrated in the decision flow diagram of FIG. 3. When the main program responds to an event to identify an installable command, step 110 (FIG. 1), and references the installable subprogram, step 112, the method of FIG. 3 is performed. Therein, the main program first reads the installable subprogram description (ISD) list (502 in FIG. 5) to obtain the long word 520 for the subprogram and other information necessary to format a call to the subprogram, step 300. As used herein, a call to the subprogram comprises storing a call word in a predetermined memory location and transferring control of the computer's processor to the instruction set of the subprogram. The call word includes information from the main program to enable the subprogram to perform its intended function. The call word is formatted as illustrated in FIG. 6A.

Figure 6A:
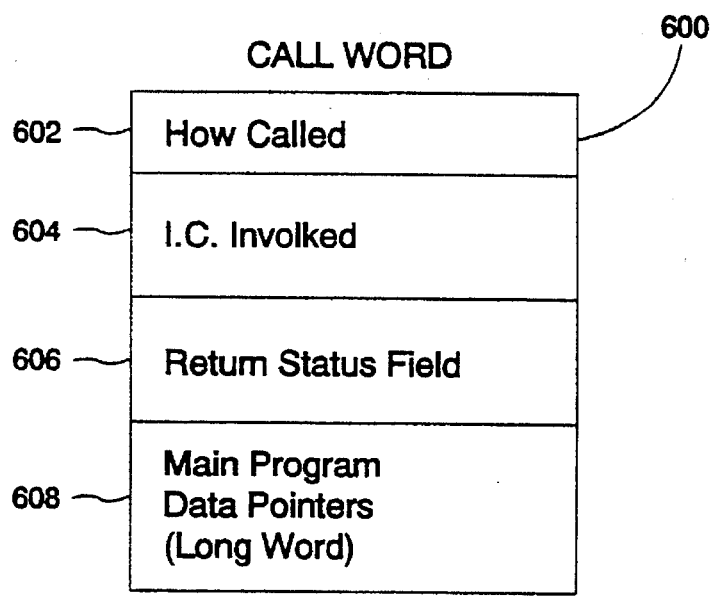
FIGS. 6A and 6B are diagrams illustrating the data structure for information packets exchanged between the main program and the discrete subprogram in accordance with the preferred embodiment described herein.

With reference to FIG. 6A, the structure for a call word 600 includes a data field 602 that contains data for identifying how the subprogram was called and a field 604 that contains data identifying the installable command that was invoked and resulted in the call. Additionally, a return status field 606 is provided for permitting the installable subprogram to return status information to the main program. The status information may include, for example: error code information to indicate that an error has occurred and identify the type of error; information to tell the main program to keep the resource file of the subprogram locked; information to tell the main program to recall the subprogram at a particular time; etc. Additionally, the call word includes main program data pointers 608 that include pointers to the main program for use by the subprogram to obtain additional information to perform the subprogram function. One of these pointers may be the long word 520 (FIG. 5B) of the subprogram that was stored in the installable subprogram description list.

A feature of the subject invention is the use of a long word to enable the subprogram to store data intermediate calls. The long word is provided to the main program by the subprogram at the conclusion of each call. The main program stores the long word in the installable subprogram description list until the next time the subprogram is called. Upon each call to the subprogram, the main program obtains the long word previously stored and returns it to the subprogram for use by the subprogram. Accordingly, the subprogram can use the long word for storing its own pointers, such as, for example, a pointer to dynamically allocated memory on a heap, or a pointer to a pointer set for allocating a variety of memory locations on the heap. Those skilled in the art will appreciate that allocation of memory space for the plurality of subprograms in this manner eliminates the need to allocate a memory block dedicated to each subprogram and thereby conserves memory. The subprogram can use the long word for any other feature desired. Additional main program data pointers are provided in the field 608, such as pointers to specific data of the main program, thereby giving the subprogram access to all data of the main program.

Once the call word to the subprogram has been formatted, the call word is stored in a memory location and the main program will read the installable command reference list to obtain the pointer to the installable subprogram (i.e., the installable subprogram pointer 506, FIG. 5), step 302. The main program will then instruct the computer's processor to jump to the memory location identified by the installable subprogram pointer, step 304, to thereby transfer control of the computer's processor to the instruction set of the subprogram. The installable subprogram will perform its function, setting the appropriate return status field and data pointers.

Figure 6B:
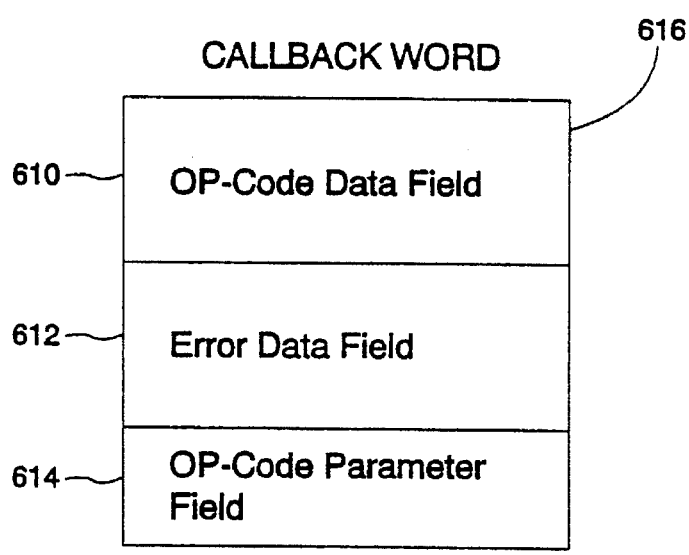

In addition to using the information transferred by the initial call, the subprogram is permitted to make inquiries to the main program using a callback word, the structure of which is illustrated in FIG. 6B. The callback word enables the installable subprogram to request operations to be performed by the main program. To this end, the first data field is an op code data field 610 that identifies the operation code that the installable subprogram is requesting the main program to perform. Following the operation code data field is an error code data field that enables the main program to identify to the subprogram any errors that may have occurred in performing the op code. Following the error data field is an op code parameter field 614 for storing information needed by the main program to execute the op code and for storing data resulting from the op code. Accordingly, the subprogram can transfer control of the computer's processor to the main program for the limited purpose of performing the op code. The main program will examine the communications word, step 308, to determine if a callback is requested, and, if so, will perform the op code, step 310, and return any necessary information in the callback word 616. Those skilled in the art will appreciate that the use of the callback word further integrates the subprogram with the main program by enabling the subprogram to request functions to be performed by the main program. As examples, the subprogram could request the main program to: allocate memory; display a message; obtain user input, etc.

After all necessary information has been performed by the subprogram, step 304, and no additional information is needed, the subprogram will store the call word in the predetermined memory location and the main program will save the subprogram long word, step 312, and return.

In accordance with the methods described above, a plurality of discrete subprograms may be integrated with a main program so that the subprograms can be readily accessed by a user. Notably, the user need only store the subprogram in a predetermined memory location, typically the same directory as the main program, to permit integration of the two programs. Thereafter, the main program is capable of identifying the subprogram and creating the cross reference array to enable integration of the plurality of subprograms with the main program. In similar manner, in order to remove a subprogram from the main program, the user need only delete the subprogram from the main programs' directory and the main program will thereafter restructure the cross reference array so that the deleted subprogram is no longer integrated as part thereof. Particular features of the subject invention are the ability of the main program to place commands of the subprogram on the main program menu, to provide key assignment to commands of the subprogram, and to perform functions requested from the subprogram.

Figure 4:
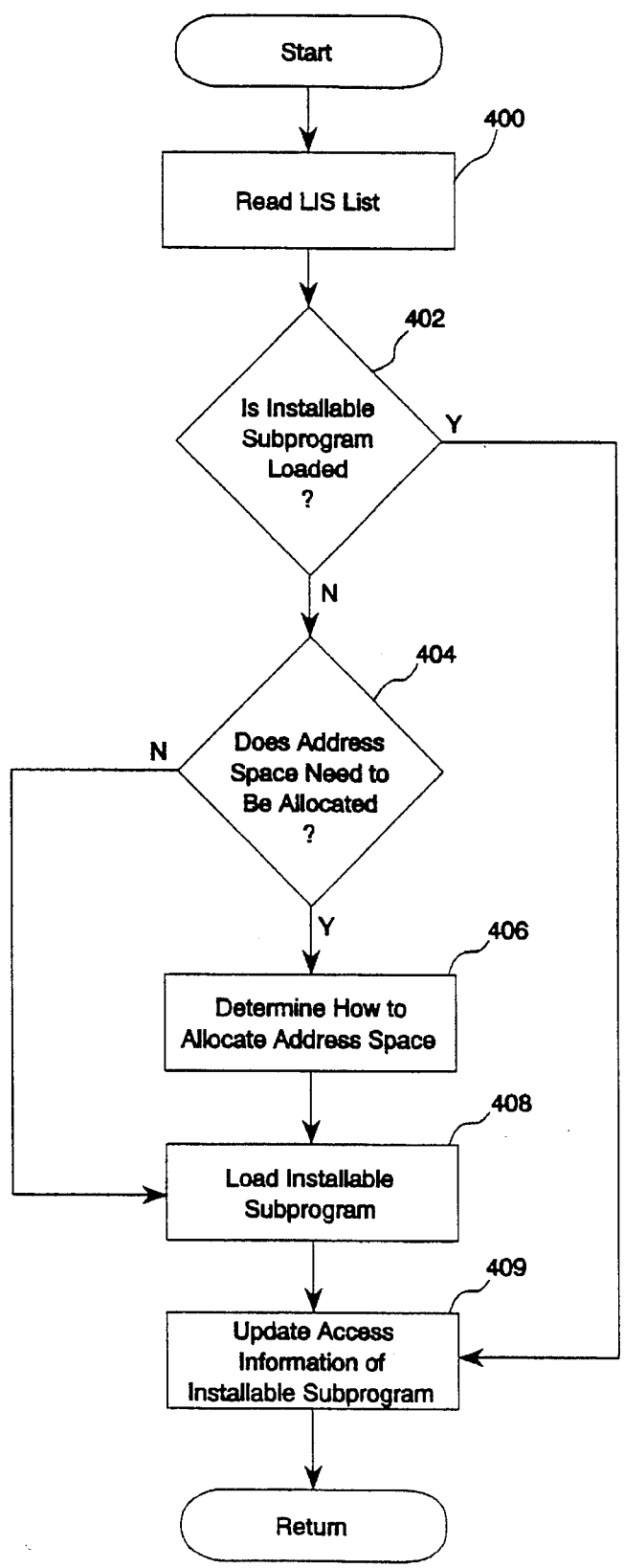
FIG. 4 is a decision flow diagram illustrating a method for conserving memory space while permitting access to a large number of discrete subprograms in accordance with the preferred embodiment described herein.

As mentioned above, a presently preferred embodiment of the subject invention permits 127 subprograms to be integrated into a main program. Those skilled in the art will appreciate that the method of the subject invention may be readily altered to permit more or less subprograms to be integrated into a main program. However, regardless of the number of subprograms permitted to be integrated with the main program, it is desirable to provide a method for limiting the number of subprograms that are loaded in the computer's address space when the main program is being executed. To this end, the method of the subject invention includes the steps of the decision flow diagram illustrated in FIG. 4.

When an installable subprogram is referenced, step 112 (FIG. 1), the main program will read a list of installable subprograms (LSI list), step 400. The LSI list is a list of installable subprograms that are currently loaded in the address space of the computer. If the installable subprogram is not loaded, step 402, then the main program determines whether address space needs to be allocated to load the installable subprogram. Those skilled in the art will appreciate that the determination of whether address space needs to be allocated can be made in a variety of ways. As an example, a predetermined amount of address space can be allocated for the plurality of installable subprograms. Alternatively, a predetermined number of subprograms can be maintained in the address space of the processor at all times. Other methods for determining whether address space needs to be allocated before loading a subprogram will readily become apparent to those skilled in the art.

If address space needs to be allocated, the main program will determine how to allocate the needed address space, step 406. In a presently preferred embodiment of the invention, the LSI list maintains an entry that indicates the last time that each subprogram loaded in the address space was accessed. The determination of step 406 is made by determining which subprogram loaded in the address space has gone the longest without being accessed and allocating the address space occupied by that subprogram first. Other methods for allocating address space to load additional subprograms will readily become apparent to those skilled in the art. After the needed address space is allocated, step 406, or if no additional address space was needed, step 404, the installable subprogram is loaded, step 408. Thereafter, access information of the installable subprogram is updated, step 409. In a presently preferred embodiment of the invention, the access information includes data indicating when each subprogram has been accessed so the determination of step 406 can be made. Other access information may be updated, as will be apparent to those skilled in the art.

From the foregoing it will be appreciated that, although a specified embodiment of the invention has been described herein for purposes of illustration, various modifications may be made without deviating from the spirit and scope of the invention. Accordingly, the invention is not limited except as by the appended claims.

We claim:

1. In a data processing system, a method for integrating a plurality of discrete subprograms with a main program wherein each of the plurality of discrete subprograms includes and is responsive to a plurality of access commands for performing a respective plurality of subprogram functions and wherein the main program is responsive to a plurality of events for performing a respective plurality of event functions, said method comprising the steps of:

(a) storing a reference identifier for each of the plurality of discrete subprograms in a predetermined directory wherein each reference identifier identifies a predetermined one of the plurality of discrete subprograms;

(b) reading the predetermined directory upon initialization of the main program to identify each of the plurality of discrete subprograms;

(c) maintaining a subprogram description list for accessing the plurality of discrete subprograms identified, the subprogram description list including a subprogram description entry for each of the plurality of discrete subprograms wherein each subprogram description entry includes the identity of the discrete subprogram and the memory location where the discrete subprogram is stored, (d) maintaining an access command reference list for referencing each of the plurality of discrete subprograms identified, the access command reference list including an access command reference entry for each of the plurality of access commands contained in each of the plurality discrete subprograms wherein each access command reference entry includes the access command and the particular one of the plurality of subprograms that is responsive to the access command;

(e) maintaining an event reference list for determining the function to be performed by the main program in response to a particular event, the event reference list including an event entry for each of the plurality of events to which the main program is responsive wherein each event entry includes function identification information for determining the function to be performed by the main program, at least one event entry including function identification information to identify a respective one of the plurality of access commands; and (f) responding to the selection of the at least one event by identifying the respective one of the plurality of discrete subprograms by reference to the access command reference list and accessing the respective one of the plurality of discrete subprogram by reference to the subprogram description list so that the respective subprogram function will be performed.

2. The method as recited in claim 1 wherein step (c) maintaining the subprogram description list further comprises the substeps of:

(g) storing the subprogram description list as a subprogram reference list before exiting the main program and storing the access command reference list before exiting the main program so that the subprogram reference list and the access command reference list will be available to the main program after it is subsequently initialized; and (h) upon subsequent initialization of the main program, identifying removed subprograms as any of the plurality of subprograms having a subprogram description entry in the subprogram description list but lacking a subprogram description entry in the subprogram reference list and, if so, identifying removed access commands as the plurality of access commands included in the removed subprogram and deleting any function identification information identifying the removed access commands from the event reference list and performing step (d).

3. The method as recited in claim 1 wherein the at least one event is the selection of a menu item and wherein step (e), maintaining the event reference list, comprises the substep of storing function identification information in the event entry associated with selection of the menu item so that the respective subprogram function will be performed in response to selection of the menu item.

4. The method as recited in claim 1 wherein the at least one event is the selection of a keyboard key by the user and wherein step (e), maintaining the event reference list, comprises the substep of storing function identification information in the event entry associated with selection of the keyboard key so that the respective subprogram function will be performed in response to selection of the keyboard key.

5. The method as recited in claim 1, further comprising the step of providing an interface routine for enabling the main program to exchange information with the plurality of subprograms, the interface routine including a plurality of information commands wherein the main program is responsive to the plurality of information commands for transferring data to the plurality of subprograms.

6. The method as recited in claim 5, further comprising the step of providing at least one information command that comprises a function command wherein the main program is responsive to the function command to perform a function and to provide the plurality of subprograms with data as a result of performance of the function.

7. The method as recited in claim 3 wherein the respective one of the plurality of access commands is contained in a first subprogram that includes menu data identifying a menu wherein information identifying the respective one of the plurality of access commands is to be displayed, said method further comprising the step of providing an interface routine for enabling the first subprogram to transfer information to the main program so that the identifying information will be displayed to the user.

8. The method as recited in claim 1, further comprising the steps of:

(i) associating a memory location and a memory identification with each of the plurality of subprograms, wherein the associated memory identification identifies the associated memory location; and (j) providing the associated memory identification and any data stored in the associated memory location to the one of the plurality of subprograms with which it is associated.

9. A method for calling a discrete subprogram with a main program wherein the discrete subprogram is responsive to a subprogram command for performing a subprogram function and wherein the main program is responsive to a system event for performing a function, said method comprising the steps of:

maintaining a cross reference array for associating the subprogram command with a particular system event and for associating the discrete subprogram with the subprogram command; and using the cross reference array to perform a command in the subprogram in response to the occurrence of the particular system event so that the function of the subprogram can be performed.

10. The method as recited in claim 9 wherein the step of maintaining a cross reference array includes the substeps of:

reading a predetermined directory to identify each subprogram stored in the predetermined directory and creating a subprogram list to identify each stored subprogram.

11. The method as recited in claim 10 wherein the step of maintaining a cross reference array includes the substeps of:

storing a portion of the cross reference array prior to exiting the main program; and comparing the stored portion of the cross reference array with the subprogram list created after the predetermined directory is read to determine if any subprograms have been added or deleted and revising the cross reference array to add or remove, respectively, references to the subprograms and subprogram commands of the subprograms that have been added or removed.

12. The method as recited in claim 10 wherein the step of maintaining a cross reference array further includes the substep of:

creating a subprogram command reference list including a subprogram command entry for each subprogram command of each subprogram stored in the predetermined directory, wherein each subprogram command entry includes a subprogram pointer identifying its respective subprogram on the subprogram reference list and a command pointer to an instruction set of its respective subprogram for executing the function of the subprogram command.

13. The method as recited in claim 12 wherein the main program includes a event reference array for identifying the command to be performed in response to a system event and wherein the step of maintaining a cross reference array further comprises the substep of:

revising the event reference array of the main program to include references to the entries of the subprogram command reference list so that in response to the particular system event, an entry of the subprogram command reference list will be identified to thereby identify an instruction set of the subprogram for performing the subprogram function.

14. The method as recited in claim 9 wherein the step of maintaining a cross reference array further includes the substep of:

creating a subprogram command reference list including a subprogram command entry for each subprogram command of the subprogram, wherein each subprogram command entry includes a pointer to an instruction set of the subprogram for executing the function of the subprogram command.

15. The method as recited in claim 14 wherein the main program includes a event reference array for identifying the command to be performed in response to a system event and wherein the step of maintaining a cross reference array further comprises the substep of:

revising the event reference array of the main program to include references to the entries of the subprogram command reference list so that in response to the particular system event, an entry of the subprogram command reference list will be identified to thereby identify an instruction set of the subprogram for performing the subprogram function.

16. The method as recited in claim 9 wherein the main program includes a event reference array for identifying the command to be performed in response to a system event and wherein the step of maintaining a cross reference array further comprises the substep of:

revising the event reference array of the main program to include references to the subprogram commands of the subprogram so that in response to the particular system event, the subprogram command will be executed.

17. The method as recited in claim 9 wherein the main program and the subprogram include respective instruction sets for execution by the processor of the computer, the step of calling the subprogram further including the substep of:

storing a call word in a storage device and transferring control of the processor to the instruction set of the subprogram, wherein the call word includes information for enabling the subprogram to perform the function.

18. The method as recited in claim 9 wherein the main program and the subprogram are to be executed on a computer having a predetermined memory space, said method further comprising the steps of:

responding to a system event and the cross reference array to identify the subprogram;

determining whether the subprogram is loaded in the address space of the computer and, if so, calling the subprogram; and allocating memory space to load the subprogram if it is not loaded and calling the subprogram.

19. The method as recited in claim 18 wherein the step of allocating memory space includes the substep of allocating memory space occupied by another subprogram so that the other subprogram is no longer accessible without being loaded.

20. The method as recited in claims 19 wherein the step of allocating memory space further includes the substeps of:

maintaining a record of when any subprograms loaded in the computer's memory space are called; and allocating memory space occupied by the subprogram that has not been called for the longest period of time.

21. In a data processing system having a storage device, a method for integrating a subprogram with a main program wherein the subprogram is responsive to a subprogram command for performing a subprogram function, the method comprising the steps of:

provating a resource file to identify the subprogram associated with a subprogram command that invokes execution of the subprogram function and an instruction set of the subprogram for performing the subprogram function;

in the main program, storing a call word in the storage device, the call word holding information for enabling execution of the subprogram function;

responding to the subprogram command in the main program by accessing the resource file to identify the subprogram associated with the subprogram command and accessing the call word to obtain data for executing the subprogram function;

executing the subprogram using the instruction set; and returning the call word from the subprogram to the main program when the function is completely executed.

22. In a data processing system, a method for integrating a discrete subprogram with a main program wherein the discrete subprogram is responsive to a subprogram command for performing a subprogram function and wherein the main program is responsive to a system event for performing a function, said method comprising the steps of:

maintaining a cross-reference array for associating the subprogram command with a particular system event and for associating the discrete subprogram with the subprogram command;

generating a callback word in the discrete subprogram for calling back into the main program, the callback word identifying at least one function to be performed by the main program;

with the main program accessing the callback word and performing the function identified to the callback word;

storing information in the callback word; and returning the callback word to the discrete subgroup after performing the identified function.

23. In a data processing system, a method for integrating a discrete subprogram with a main program wherein the discrete subprogram is responsive to a subprogram command for performing a subprogram function and wherein the main program is responsive to a system event for performing a function, said method comprising the steps of:

maintaining a cross-reference array for associating the subprogram command with a particular system event and for associating the discrete subprogram with the subprogram command;

storing a long word for holding data used by the discrete subprogram, the long word being provided by the discrete subprogram;

calling the subprogram in response to the occurrence of the particular system event so that the function of the subprogram can be performed, said step of calling the subprogram further comprising the substeps of:

retrieving the long word with the main program; and returning the retrieved long word to the discrete subprogram so that the discrete subprogram may use the data stored in the long word and forwarding a call word from the main program to the discrete subprogram.

24. In a data processing system having a processor and a memory means, a method for integrating a discrete subprogram with a main program wherein the discrete subprogram is responsive to a subprogram command for performing a subprogram function and wherein the main program is responsive to a system event for performing a function, said method comprising the steps of:

maintaining a cross-reference array for associating the subprogram command with a particular system event and for associating the discrete subprogram with the subprogram command;

running the main program on the processor;

calling the subprogram from the main program in response to the occurrence of the particular system event so that the function of the subprogram can be performed, said step of calling the subprogram further comprising the substeps of:

formatting a call word for providing the subprogram with data from the main program in the main program, running the subprogram on the processor, wherein the call word includes a long word for storing data used by the subprogram;

generating a callback request to the main program from the subprogram;

providing a callback word holding data to be used in a callback to the main program from the subprogram, said callback word identifying at least one function to be performed;

responding to the callback request from the subprogram to perform the functions identified by the callback word provided by the subprogram and altering the callback word to return information to the subprogram after the identified functions have been performed; and reading the long word provided by the subprogram after calling the subprogram and storing the long word provided by the subprogram in the memory means.

25. In a data processing system having a storage for storing information, a method of integrating a subprogram with a main program having at least one main program function wherein the subprogram is responsive to a subprogram command for performing a subprogram function, the method comprising the steps of:

providing a resource file to identify the subprogram command to which the subprogram is responsive and an instruction set of the subprogram for performing the subprogram function;

storing a call word in the storage holding information for enabling performance of the subprogram function in the storage;

in the main program, invoking the subprogram command;

responding to the invoking of the subprogram command by forwarding the call word to the subprogram and accessing the call word by the subprogram function to obtain data for performing the subprogram function and returning the call word to the main program after the function is performed; and formatting a callback request to the main program from the subprogram function to perform the main program function wherein the callback request includes an operational code for the main program function to be performed by the main program and parameters necessary for performing the main program function.

* * * * *